(12) United States Patent
Badding et al.

(10) Patent No.: US 11,753,347 B2
(45) Date of Patent: Sep. 12, 2023

(54) RAPID FORMING OF GLASS AND CERAMICS

(71) Applicant: CORNING INCORPORATED, Corning, NY (US)

(72) Inventors: Michael Edward Badding, Campbell, NY (US); William Joseph Bouton, Big Flats, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 186 days.

(21) Appl. No.: 17/069,025

(22) Filed: Oct. 13, 2020

(65) Prior Publication Data

US 2021/0107841 A1 Apr. 15, 2021

Related U.S. Application Data

(60) Provisional application No. 62/914,636, filed on Oct. 14, 2019.

(51) Int. Cl.
*C04B 41/00* (2006.01)
*C04B 38/00* (2006.01)
(Continued)

(52) U.S. Cl.
CPC .......... *C04B 41/0063* (2013.01); *B28B 3/006* (2013.01); *C03B 23/0355* (2013.01); *C03B 23/0357* (2013.01); *C04B 38/0074* (2013.01); *B23B 31/307* (2013.01); *B25B 11/005* (2013.01); *B28B 11/005* (2013.01); *C04B 2235/5436* (2013.01)

(58) Field of Classification Search
CPC ....... C28B 3/006; B28B 3/006; B23B 31/307; B25B 11/005; B25B 11/00; C03B 23/035; C03B 23/03
See application file for complete search history.

(56) References Cited

U.S. PATENT DOCUMENTS 5,788,732 A * 8/1998 Nomura .................. C03B 11/16
65/102
6,015,518 A * 1/2000 Hirzel ..................... B28B 7/344
264/122

(Continued)

FOREIGN PATENT DOCUMENTS

CN 101586882 A * 11/2009 ............. B28B 11/12
CN 108793685 A * 11/2018
(Continued)

OTHER PUBLICATIONS

Donachie, Jr., "Titanium—A Technical Guide—Second Edition", 216 pages.

*Primary Examiner* — Galen H Hauth
*Assistant Examiner* — Steven S Lee

(57) ABSTRACT

A method for finishing a glass or ceramic article includes applying a force to the glass or ceramic article. The force is applied to the glass or ceramic article at least when the glass or ceramic article is at a temperature that is greater than or equal to a creep temperature of the glass or ceramic article. Holding the force to the glass or ceramic article as the glass or ceramic article is cooled to a temperature that is less than the creep temperature of the glass or ceramic article.

16 Claims, 13 Drawing Sheets

(51) Int. Cl.
  *C03B 23/035* (2006.01)
  *B25B 11/00* (2006.01)
  *B23B 31/30* (2006.01)
  *B28B 11/00* (2006.01)
  *B28B 3/00* (2006.01)

(56) References Cited

U.S. PATENT DOCUMENTS

| | | | |
|---|---|---|---|
| 6,844,921 B2 | 1/2005 | Komatsu | |
| 7,721,572 B2 * | 5/2010 | Taplan | C03B 23/26 65/106 |
| 8,893,526 B2 * | 11/2014 | Liu | C03B 23/0352 95/287 |
| 2002/0121112 A1 * | 9/2002 | Schroeder | C03B 23/0357 65/273 |
| 2002/0163109 A1 * | 11/2002 | Kirby | F42B 15/34 264/633 |
| 2006/0043652 A1 * | 3/2006 | Saijo | C04B 35/80 264/671 |
| 2006/0219605 A1 * | 10/2006 | Devitt | F16C 29/025 209/37 |
| 2013/0298608 A1 * | 11/2013 | Langsdorf | C03B 23/035 65/106 |
| 2014/0335322 A1 * | 11/2014 | Luo | H05K 5/03 65/273 |
| 2016/0031739 A1 * | 2/2016 | Lezzi | C03B 29/16 65/157 |
| 2016/0031752 A1 | 2/2016 | Maschmeyer et al. | |
| 2016/0376184 A1 * | 12/2016 | Atkins-Barratt | B29C 51/262 65/102 |
| 2017/0029279 A1 | 2/2017 | Kim et al. | |
| 2017/0210634 A1 * | 7/2017 | Badding | C04B 35/111 |
| 2018/0282207 A1 * | 10/2018 | Fujii | C03B 25/025 |
| 2018/0327301 A1 * | 11/2018 | Fujii | C03B 23/0258 |

FOREIGN PATENT DOCUMENTS

| | | | | |
|---|---|---|---|---|
| CN | 109111091 A | * | 1/2019 | C03B 23/0302 |
| CN | 109320213 A | * | 2/2019 | |
| DE | 102005060907 A1 | * | 6/2007 | C03B 23/0252 |
| JP | 2000086374 A | * | 3/2000 | C03B 35/181 |
| JP | 2002348132 A | * | 12/2002 | C03B 40/02 |
| JP | 2003020248 A | * | 1/2003 | C03B 11/02 |
| JP | 2005-159101 A | | 6/2005 | |
| WO | WO-0110792 A1 | * | 2/2001 | B28B 17/026 |
| WO | 2015/064882 A1 | | 5/2015 | |

* cited by examiner

RAPID FORMING OF GLASS AND CERAMICS

CROSS-REFERENCE TO RELATED APPLICATIONS

This application claims the benefit of priority under 35 U.S.C. § 119 of U.S. Provisional Application Ser. No. 62/914,636 filed on Oct. 14, 2019, the content of which is relied upon and incorporated herein by reference in its entirety.

BACKGROUND

Field

The present specification generally relates to methods for forming glass or ceramic thin sheets and, more specifically, to methods for forming flat glass or ceramic thin sheets or glass or glass ceramic thin sheets with an intentional shape.

Technical Background

Current continuously fired ceramic (CFC) processes use a tape of glass or ceramic cast material that undergoes binder burnout and sintering in a continuous process. However, the products formed by CFC processing may have areas of local curvature that present themselves as wrinkles in the glass or ceramic. These areas of curvature can cause problems in downstream processing.

Accordingly, a need exists for systems and processes that can be used with CFC forming that improve the flatness of the glass or ceramic thin sheet.

SUMMARY

According to a first clause, a method for finishing a glass or ceramic article comprises: applying a force to the glass or ceramic article, wherein the force is applied to the glass or ceramic article at least when the glass or ceramic article is at a temperature that is greater than or equal to a creep temperature of the glass or ceramic article; and holding the force to the glass or ceramic article as the glass or ceramic article is cooled to a temperature that is less than the creep temperature of the glass or ceramic article.

A second clause includes a method according to the first clause, wherein the force is applied to the glass or ceramic article by a vacuum chuck and drawing a vacuum through the vacuum chuck.

A third clause includes the method of the first or second clause, wherein the vacuum chuck has a porosity from greater than or equal to 5% and less than or equal to 22% measured using mercury porosimetry.

A fourth clause incudes the method of any of the first through third clauses, wherein the vacuum chuck has an average pore size from greater than or equal to 5 µm and less than or equal to 40 µm measured by mercury porosimetry.

A fifth clause incudes the method of any of the first through fourth clauses, wherein the glass or ceramic article is in physical contact with the vacuum chuck.

A sixth clause incudes the method of any of the first through fifth, wherein a porous slider is positioned between the glass or ceramic article and the vacuum chuck, and the porous slider is configured so that the glass or ceramic article is in physical contact with the vacuum chuck and the vacuum is drawn through the porous slider and the vacuum chuck.

A seventh clause incudes the method of any of the first through sixth clauses, wherein the porous slider has a porosity from greater than or equal to 5% and less than or equal to 22% measured using mercury porosimetry.

An eighth clause incudes the method of any of the first through seventh clauses, wherein the porous slider has an average pore size from greater than or equal to 5 µm and less than or equal to 40 µm measured by mercury porosimetry.

A ninth clause incudes the method of any of the first through eighth clauses, wherein the vacuum chuck is positioned on a first side of the glass or ceramic article, and an additional force is applied to the glass or ceramic article by an air bearing that is positioned on a second side of the glass or ceramic article, and the second side of the glass or ceramic article is opposite the first side of the glass or ceramic article.

A tenth clause incudes the method of any of the first through ninth clauses, wherein the force is applied to the glass or ceramic article by a first air bearing and a second air bearing, the first air bearing is positioned on a first side of the glass or ceramic article, and the second air bearing is positioned on a second side of the glass or ceramic article, the second side of the glass or ceramic article is opposite the first side of the glass or ceramic article.

An eleventh clause incudes the method of any of the first through tenth clauses, wherein the glass or ceramic article is continuously fed into a furnace that heats the glass or ceramic article to a temperature that is greater than or equal to the creep temperature of the glass or ceramic article.

A twelfth clause incudes the method of any of the first through eleventh clauses, wherein the finished glass or ceramic article has a flatness of less than or equal to 15 µm/in2.

A thirteenth clause incudes the method of any of the first through twelfth clauses, wherein the finished glass or ceramic article has a surface roughness of greater than or equal to 0.5 µm and less than or equal to 15.0 µm.

A fourteenth clause incudes a method for forming a shaped glass or ceramic article comprising: positioning a glass or ceramic sheet adjacent to a forming tool; applying a force to the glass or ceramic sheet, wherein the force is applied to the glass or ceramic sheet at least when the glass or ceramic sheet is at a temperatures that is greater than or equal to a creep temperature of the glass or ceramic sheet, and wherein the force draws the glass or ceramic sheet to the forming tool; and holding the force to the glass or ceramic sheet as the glass or ceramic sheet is cooled to a temperature that is less than the creep temperature of the glass or ceramic sheet, thereby forming the shaped glass or ceramic article.

A fifteenth clause incudes the method of the fourteenth clause, wherein the force is applied by drawing a vacuum through the forming tool.

A sixteenth clause includes the method of any one of the fourteenth of fifteenth clauses, wherein the forming tool has a porosity from greater than or equal to 5% and less than or equal to 22% measured using mercury porosimetry.

A seventeenth clause incudes the method of any of the first through sixteenth clauses, wherein the forming tool has an average pore size from greater than or equal to 5 µm and less than or equal to 40 µm measured by mercury porosimetry.

Additional features and advantages will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
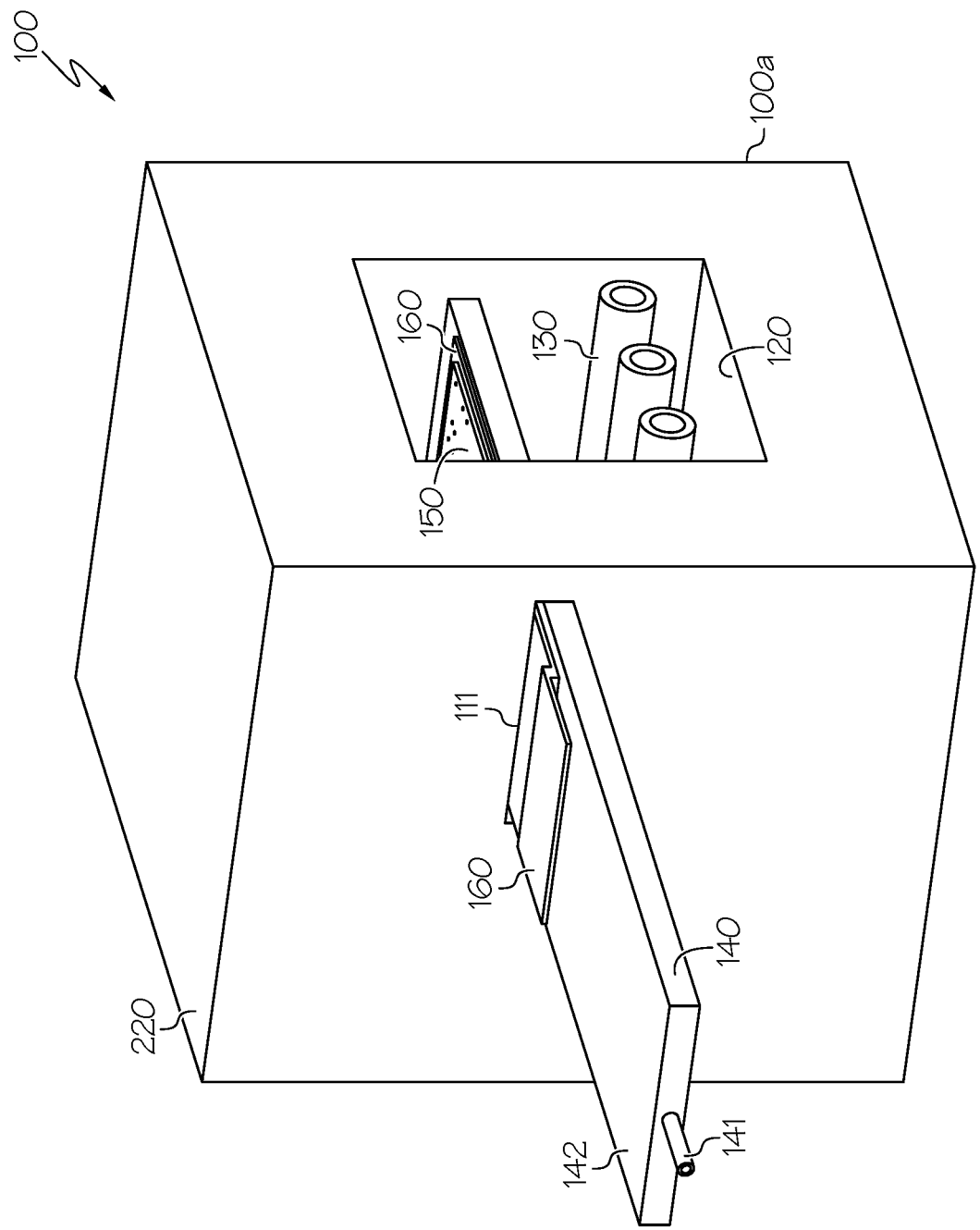
FIG. 1 schematically depicts an apparatus for conducting forming processes according to embodiments disclosed and described herein.

Reference will now be made in detail to embodiments of methods for forming flat thin glass or ceramic sheets by vacuum forming, embodiments of which are illustrated in the accompanying drawings. Whenever possible, the same reference numerals will be used throughout the drawings to refer to the same or like parts. In one embodiment, a method for finishing a glass or ceramic article comprises: applying a force to the glass or ceramic article, wherein the force is applied to the glass or ceramic article at least when the glass or ceramic article is at a temperature that is greater than or equal to a creep temperature of the glass or ceramic article; and holding the force to the glass or ceramic article as the glass or ceramic article is cooled to a temperature that is less than the creep temperature of the glass or ceramic article.

Various methods of vacuum forming glass or ceramic flat thin sheets will be described herein with specific reference to the appended drawings.

The current CFC process uses a tape cast material, such as, for example, glass or ceramic, which undergoes binder burnout and sintering in a continuous process. The continuous process is not limited and may include moving a green glass or ceramic material through an over or a lehr. As the glass or ceramic material moves through the oven or lehr, it undergoes the above-described binder burnout and sintering. However, because the glass or ceramic undergoes binder burnout and sintering as it moves from one end of the oven or lehr to another end of the oven or lehr, glass or ceramic material may be continuously inserted into the oven or lehr. One issue with this process is that the end product, although relatively flat (~1 mm overall bow), is often not flat enough for certain applications. Areas of local curvature (which present themselves as wrinkles) are also present which can complicate downstream processing.

In conventional methods, creep flattening processes addresses these areas of local curvature or wrinkles. Creep flattening is a process where the sintered glass or ceramic is stacked in a furnace with weight applied to the stack, the stack is then heated until the glass or ceramic is softened so that it will flatten. The glass or ceramic stack is then cooled and removed from the furnace, and then the weight is removed from the stack. In contrast, methods disclose and described herein provide the ability to flatten the glass or ceramic tape in situ, providing a much faster and more cost effective way to form flat glass or ceramic thin sheets by eliminating the need for a separate creep flattening process. For instance methods disclosed and described herein are able to decrease the processing time of glass or ceramic thin sheets from several hours down to several seconds on thin (20-80 μm) ceramic or glass sheets.

Processes for vacuum forming flat glass or ceramic thin sheets according to embodiments will now be described. To form a flat glass or ceramic thin sheet according to embodiments, a force is applied to the glass or ceramic thin sheet that is being formed from the point that the glass or ceramic article reaches its creep temperature until the glass or ceramic thin sheet is cooled to a temperature below its creep temperature. At or slightly above the creep temperature of the glass or ceramic thin sheet, the glass or ceramic is moldable but not liquid. In this state, the glass or ceramic is amenable to molding or flattening, and the shape to which the glass or ceramic is molded is not reversible at temperatures below the creep temperature. Put differently, to reverse the shape of glass or ceramics formed by vacuum forming processes disclosed and described herein, the glass or ceramic will need to be re-heated above the creep temperature. Accordingly, in embodiments, a force is applied to the glass or ceramic at a first temperature that is greater than or equal to the creep temperature, and the force is maintained until the glass or ceramic is cooled to a temperature that is less than the creep temperature. It should be understood that the force may also be applied at any point during heating the glass or ceramic to the first temperature that is greater than or equal to the creep temperature. As an example, the force may be applied to the glass or ceramic at room temperature and maintained during the heating of the glass or ceramic to the first temperature that is greater than or equal to the creep temperature. Creep temperature was measured using a 40 μm thick alumina tape, a creep flattening protocol was used in a furnace with a ramp rate of 2° C./min heating to 1350° C. and held for 5 minutes. Using a range around 1350° C., the tape is inserted into the furnace in less than 10 seconds, a vacuum is applied for 1 minute, the vacuum is released, and the tape is removed at about 600 inches per minute (ipm). A vacuum chuck temperature of 1370° C. was found to be a good working temperature.

In embodiments, the glass or ceramic may be heated to temperature greater than or equal to 1250° C., such as greater than or equal to 1300° C., greater than or equal to 1350° C., greater than or equal to 1400° C., greater than or equal to 1450° C., greater than or equal to 1500° C., greater than or equal to 1550° C., greater than or equal to 1600° C., greater than or equal to 1650° C., greater than or equal to 1700° C., greater than or equal to 1750° C., or, greater than or equal to 1800° C. to reach the creep temperature of the glass or ceramic. The maximum temperature to which the glass or ceramic will be heated is limited by the design and efficiency of the furnace that is being used.

According to embodiments, the glass or ceramic is cooled by removing the glass or ceramic from the furnace and allowing the glass or ceramic to cool to a temperature below the creep temperature of the glass or ceramic. Once removed from the furnace, the glass or ceramic rapidly cools to a temperature that is below the creep temperature of the glass or ceramic. This is generally because there is a large temperature differential between the temperature of the glass or ceramic after it exits the furnace (such as greater than or equal to 1400° C.) and the ambient conditions (such as about 20° C.). In some embodiments, cooling the glass or ceramic to a temperature below the creep temperature of the glass or glass ceramic less than or equal to 5 minutes, such as less than or equal to 4 minutes, less than or equal to 3 minutes, less than or equal to 2 minutes, less than or equal to 1 minute, less than or equal to 45 seconds, less than or equal to 30 seconds, less than or equal to 15 seconds, less than or equal to 5 seconds, or less than or equal to 1 second. Once the glass or ceramic is at a temperature that is below the creep temperature, the force may be removed from the glass or glass ceramic, and the glass or glass ceramic will retain the shape provided by the forming process.

With reference now to FIG. 1, an apparatus 100 configured to perform vacuum forming processes according to embodiments disclosed and described herein is provided. The apparatus 100 includes a furnace 110 (also referred to as an "oven") that has insulation, such as, for example, an insulating housing encompassing a heating chamber 120. It should be understood that side 100a provides a cross section of the apparatus 100 and is not open to the surrounding environment. The furnace 110 includes heating elements 130 that are used to heat the heating chamber 120 to a desired temperature. The heating elements 130 may be controlled by any conventional control mechanism a programming to maintain the temperature within the heating chamber 120 at a desired temperature. It should be understood that the temperature within the heating chamber 120 refers to a temperature of the atmosphere within the heating chamber 120 as measured by conventional temperature measuring apparatuses, such as thermometers or thermocouples. The temperature of the heating chamber 120 may be the average temperature of the heating chamber 120 where more than one temperature measuring apparatus is used to measure the temperature of the heating chamber 120. According to embodiments, the apparatus 100 also includes a vacuum chuck 140 that is used to hold the glass or ceramic article 150 that is to be worked on. The vacuum chuck 140 includes a vacuum port 141 that may be connected to a mechanism (not shown in FIG. 1) that can cause a pressure differential such that the vacuum chuck 140 is capable of holding a glass or ceramic article 150 to that is to be worked on at a surface of the vacuum chuck 140. For example, the mechanism may be a pump. According to embodiments, the apparatus 100 also includes a slider 160 that is configured to slide the glass or ceramic article 150 into the heating chamber 120 through a small opening 111 in the furnace 110. According to embodiments, the opening 111 in the furnace 110 is sized such that the vacuum chuck 140, the glass or ceramic article 150, and the slider 160 can slide into the heating chamber 120. However, in embodiments, the opening 111 is not much larger than the thickness of the vacuum chuck 140, the glass or ceramic article 150, and the slider 160 so that the amount of heat that escapes the furnace 110 through the opening 111 is kept to a minimum.

The addition of a gas into the furnace 110 could be used in embodiments to enhance the properties of the glass or ceramic 150. For instance, helium may be used to close pores in the glass or glass ceramic 150 for certain applications, such as, for example, fiber forming. The addition of gas into the furnace 110 can also be used to reduce the effects of degradation of the materials used for components of the vacuum system. One example is the use of argon to prevent silicon carbide from oxidizing and creating silica. In such an embodiment, argon can be introduced into the heating chamber 120. The vacuum chuck 140 would then pull the argon through the pores of the vacuum chuck 140, creating a favorable atmosphere for longevity of the silicon carbide material.

As can be seen in FIG. 1, according to embodiments, the vacuum chuck 140 is sized so that a portion of the vacuum chuck 140 is positioned within the heating chamber 120 and so that a portion of the vacuum chuck 140 is positioned outside of the heating chamber 120. As will be discussed in more detail herein, according to embodiments the vacuum chuck 140 and the slider 160 are porous such that the vacuum pulled via the vacuum port 141 in the vacuum chuck 140 is transferred from the vacuum chuck 140 through the thickness of the slider 160 so that a glass or ceramic article 150 may be placed on and held to the slider 160 while the slider 160 is used to slide the glass or ceramic article 150 into and out from the heating chamber 120. This may be accomplished with a vacuum chuck 140 having at least a top surface 142 (for example, the surface that is adjacent to the slider 160) that is porous and a slider where both the top surface and the bottom surface (for example the surface adjacent to the vacuum chuck 140) are porous.

According to embodiments, the vacuum may be turned on or off at any time during the process as long as the vacuum is applied when the glass or ceramic 150 is at a first temperature that is greater than or equal to the creep temperature of the glass or ceramic. The vacuum may also be applied as the glass or ceramic 150 is cooling from this first temperature to a temperature that is below the creep temperature of the glass or ceramic 150 so that cooling stresses do not impart an undesired final shape. In some embodiments, the glass or ceramic is cooled sufficiently, the vacuum may be turned off and the glass or ceramic may be removed from the vacuum chuck 140, either mechanically or by pressurizing the vacuum chuck 140 with gas. In one or more embodiments, a top air bearing floats above the glass or ceramic and pressure is applied on the bottom bearing, both of which impart pressure to keep the part flat so that it remains flat as it is removed from the furnace and cooled.

By switching between a vacuum and pressurized gas at the vacuum chuck 140, the vacuum chuck 140 can be converted to a release the part. The vacuum chuck 140 can also be converted into an air bearing, which could be used to shuttle the pre-formed glass or ceramic into the furnace, especially in embodiments where the porous slider 160 or vacuum chuck 140 has been machined to accept the preformed glass or ceramic. In such embodiments, the porous slider 160 of the vacuum chuck 140 may have a machined orifice that is configured to fit the unfinished glass or ceramic.

Although FIG. 1 discloses an apparatus where the force discussed above that is applied to the glass or ceramic 150 is applied by a vacuum chuck, according to embodiments, the force disclosed above that is applied to the glass or ceramic maybe applied by a vacuum chuck, a vacuum chuck combined with an air bearing, or a pair of air bearings. Structurally, a vacuum chuck and an air bearing are similar. However, functionally, gas is drawn through a vacuum chuck and out of a vacuum port, while gas is pushed through a port and to an air bearing. It should be understood that any gas, such as nitrogen, argon, helium, and the like may be pushed through a port and into the air bearing.

Figure 2A:
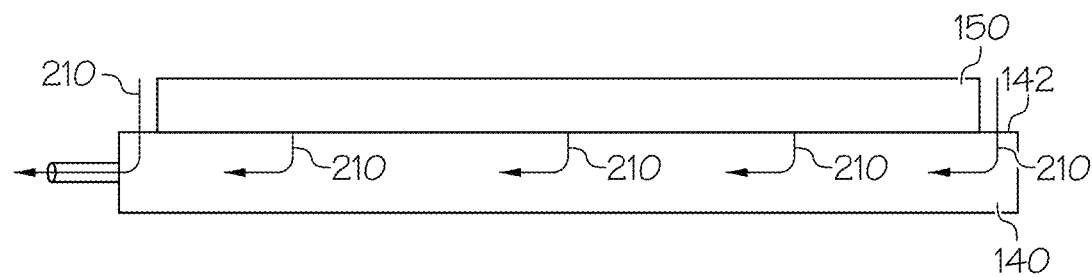
FIG. 2A schematically depicts a vacuum chuck for conducting forming processes according to embodiments disclosed and described herein.

In some embodiments, and with reference to FIG. 2A a vacuum chuck 140 is provided and the glass or ceramic 150 is drawn to a surface 142 of the vacuum chuck 140 when gas 210 is drawn through the vacuum chuck 140 and out the vacuum port 141, thereby providing a force to the glass or ceramic 150. It should be understood that in embodiments a porous intermediate structure, for example a porous slider (not shown), may be provided between the glass or ceramic 150 and the vacuum chuck 140 such that a vacuum is applied from the vacuum chuck 140 through the intermediate structure and to the glass or ceramic 150. This force will prevent or mitigate areas of local curvature in the glass or ceramic by holding the glass or ceramic 150 during periods of cooling where warping is prevalent. The force applied by the vacuum chuck 140 may be adjusted by varying the flow of gas 210 through the vacuum port 141 such that the force is not so great as to mar the surface of the glass or ceramic 150 in contact with the vacuum chuck 140.

Figure 2B:
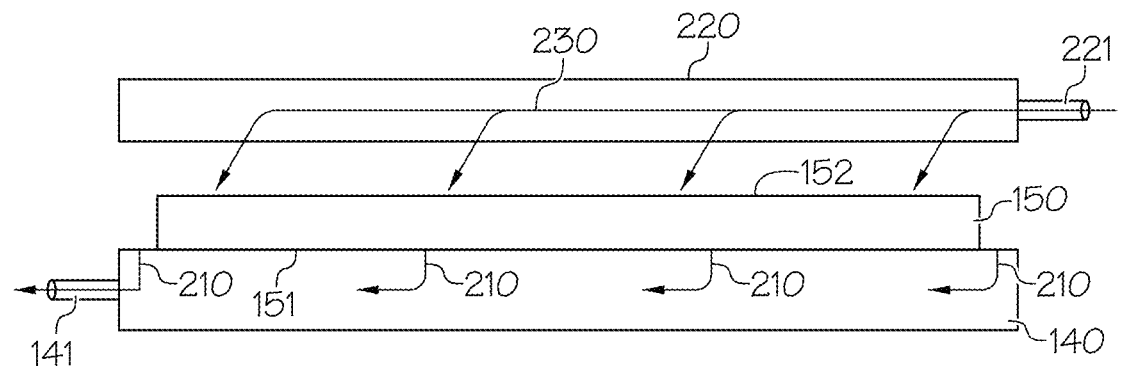
FIG. 2B schematically depicts a vacuum chuck and air bearing for conducting forming processes according to embodiments disclosed and described herein.

In some embodiments, and with reference to FIG. 2B, a vacuum chuck 140 may be present on a first side 151 (for example the bottom) of the glass or ceramic 150 and an air bearing 220 may be present on a second side 152 (for example the top) of the glass or ceramic 150. In embodiments with this configuration, force is provided where the glass or ceramic 150 is drawn to a surface of the vacuum chuck 140 by drawing gas 210 through the vacuum chuck 140 and out the vacuum port 141. It should be understood that in embodiments a porous intermediate structure, for example a porous slider (not shown), may be provided between the glass or ceramic 150 and the vacuum chuck 140 such that a vacuum is applied from the vacuum chuck 140 through the intermediate structure and to the glass or ceramic 150. Additional force is provided by moving gas 230 through the air bearing 220 via a gas entrance port 221. The gas 230 pushes down on the glass or ceramic 150 to provide the force. These forces will prevent or mitigate areas of local curvature in the glass or ceramic 150 by holding the glass or ceramic during periods of cooling where warping is prevalent. The force applied by the vacuum chuck 140 may be adjusted by varying the flow of gas 210 through the vacuum port 141 such that the force is not so great as to mar the surface of the glass or ceramic 150 in contact with the vacuum chuck 140. Similarly, the force applied by air bearing 220 may be adjusted by varying the flow of gas 230 through the gas entrance port 221 such that the force is not so great as to mar the surface of the glass or ceramic 150.

Figure 2C:
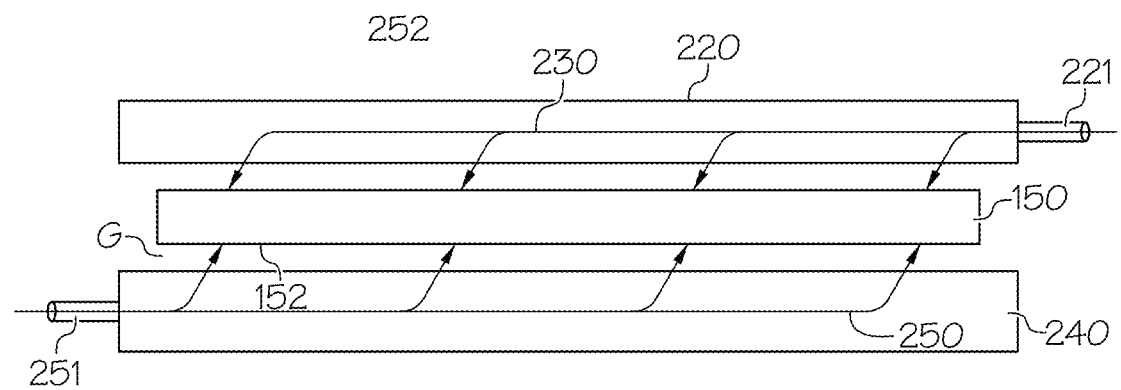
FIG. 2C schematically depicts two air bearings for conducting forming processes according to embodiments disclosed and described herein.

In some embodiments, and with reference to FIG. 2C, two air bearings 220, 240 may be present on either side 151, 152 of the glass or ceramic 150. Dimples have been present in tapes that are formed using a vacuum. It was found that these are caused by particles trapped between one or more bearing and the tape. Having a top pressurized bearing not only helps to flatten the tape, but also acts as a barrier to keep debris from getting onto apparatus and/or the glass or ceramic 150. In embodiments with this configuration, force is provided in one direction by moving gas 230 through the air bearing 220 via a gas entrance port 221. The gas 230 pushes down on the second surface 152 of the glass or ceramic 150 to provide a force. Additional force is provided in another direction by moving gas 250 through the air bearing 240 via a gas entrance port 251. The gas 250 pushes up on the first surface 151 of the glass or ceramic 150 to provide a force. In various embodiments, the gases 230 and 250 may be the same or different. As shown in FIG. 2C, a gap G may be present between air bearing 240 and the glass or ceramic 150. Although enlarged in FIG. 2C, this gap G may be very small, such as less than or equal to 10 µm, less than or equal to 8 µm, less than or equal to 6 µm, less than or equal to 4 µm, less than or equal to 2 µm, or less than or equal to 1 µm. Accordingly, in embodiments, the glass or ceramic 150 does not contact either the air bearing 220 or air bearing 240 while a force is applied to the glass or ceramic 150 by the air bearings 220, 240. These forces will prevent or mitigate areas of local curvature in the glass or ceramic 150 by holding the glass or ceramic during periods of cooling where warping is prevalent. The force applied by air bearing 220 may be adjusted by varying the flow of gas 230 through the gas entrance port 221 such that the force is not so great as to mar the surface of the glass or ceramic 150. Similarly, the force applied by air bearing 240 may be adjusted by varying the flow of gas 250 through the gas entrance port 251 such that the force is not so great as to mar the surface of the glass or ceramic 150. In some embodiments, an air cylinder may be used in place of a clamp where a greater force is to be applied to the glass or ceramic. The force applied by the air cylinder can be used to keep the glass or ceramic flat during the processing in place of the air bearings.

Referring again to FIG. 1, by adding a porous structure having a low thermal mass (such as a porous slider 160) for the glass or ceramic 150 to be placed on negates the need for the entire vacuum chuck 140 to be slid in and out of the furnace 110. Having a low thermal mass, the glass or ceramic 150 could be slid into the furnace 110 and pulled out of the furnace 110 as quickly as possible, allowing the process to be sped up compared to conventional creep forming processes. Being porous, the porous slider 160 imparts a vacuum on the glass or ceramic 150 from the vacuum chuck 140 that is positioned below be porous slider 160, allowing the vacuum chuck 140 to remain in place and stationary during the entire operation. Accordingly, in embodiments, the portion of the vacuum chuck 140 that extends out of the furnace 110 only needs to extend from the furnace 110 as long as required to hold a vacuum on the glass or ceramic 150 to the point where the glass or ceramic is at a temperature less than the creep temperature. A benefit of having a porous slider 160 is that it can be used for forming glass or ceramics into shapes. However, using air bearings and/or vacuum chucks may, in embodiments, be better for flat glass or ceramics because they can be used in a continuous process, whereas the porous slider 160 cannot.

Whichever structure (the vacuum chuck 140 or the slider 160) is to be exposed to rapid heating and cooling (for example by being inserted into and pulled out of the furnace) will need to be made of a material that has a high thermal shock tolerance. As stated above, the heating chamber 120 of the furnace 110 may be heated to temperatures in excess of 1450° C., so the structured being inserted into the heating chamber 120 will be exposed to temperatures in excess of 1450° C. and then, almost instantaneously, exposed to ambient temperature of about 20° C. One such material that may be used for this component is silicon carbide, but other alloys or high temperature ceramics could also be used, such as, for example, porous high temperature metal alloys, alumina and silicon nitride.

Materials that may be used for the structure that is to be exposed to rapid heating or cooling may, according to embodiments, have a high thermal shock tolerance.

Another property of the material that is used for the structure that is to be exposed to rapid heating and cooling is the porosity. The porosity of the material can affect the amount of heat that is lost from the furnace, as heat will more easily move through a porous material, and a porosity that is too high may allow exit gases, such as those exiting through the vacuum port of the vacuum chuck, high so that the exit gases damage the vacuum pump. However, a material with low porosity may not allow the vacuum chuck to pull a sufficient vacuum to draw the glass or ceramic to the vacuum chuck. Accordingly, in embodiments the porosity of the material that is used for the structure that is to be exposed to rapid heating and cooling is, in one or more embodiments, greater than or equal to 5% and less than or equal to 22% measured using mercury porosimetry, such as greater than or equal to 8% and less than or equal to 22%, greater than or equal to 10% and less than or equal to 22%, greater than or equal to 12% and less than or equal to 22%, greater than or equal to 15% and less than or equal to 22%, greater than or equal to 18% and less than or equal to 22%, or greater than or equal to 20% and less than or equal to 22%. In embodiments, the porosity of the material that is used for the structure that is to be exposed to rapid heating and cooling is greater than or equal to 5% and less than or equal to 20% measured using mercury porosimetry, such as greater than or equal to 5% and less than or equal to 20% greater than or equal to 5% and less than or equal to 15%, greater than or equal to 5% and less than or equal to 12%, greater than or equal to 5% and less than or equal to 10%, or greater than or equal to 5% and less than or equal to 8%. In embodiments, the porosity of the material that is used for the structure that is to be exposed to rapid heating and cooling is greater than or equal to 8% and less than or equal to 20% measured using mercury porosimetry, such as greater than or equal to 10% and less than or equal to 15.

Pore size can also effect the final product of the glass or ceramic. The pore size can affect the localized shape of the finished glass or ceramic because when the glass or ceramic is drawn to the vacuum chuck or porous slider, small imperfections, such as bumps, corresponding to the pores may present themselves on the glass or ceramic. Accordingly, larger pore sizes could lead to larger imperfections. However, the strength of the vacuum can also be adjusted to minimize the effect of the pore size on the final product of the glass or ceramic. For instance, the gas flow through the vacuum port may be reduced so that the vacuum drawn in the vacuum chuck is just enough draw the glass or ceramic to the vacuum chuck or porous slider. Accordingly, in embodiments, the average pore size of the material that is used for the structure that is to contact the glass or ceramic is greater than or equal to 5 µm and less than or equal to 40 µm measured by mercury porosimetry, such as greater than or equal to 8 µm and less than or equal to 40 µm, greater than or equal to 10 µm and less than or equal to 40 µm, greater than or equal to 12 µm and less than or equal to 40 µm, greater than or equal to 15 µm and less than or equal to 40 µm, greater than or equal to 18 µm and less than or equal to 40 µm, greater than or equal to 20 µm and less than or equal to 40 µm, greater than or equal to 22 µm and less than or equal to 40 µm, greater than or equal to 25 µm and less than or equal to 40 µm, greater than or equal to 28 µm and less than or equal to 40 µm, greater than or equal to 30 µm and less than or equal to 40 µm, greater than or equal to 32 µm and less than or equal to 40 µm, greater than or equal to 35 µm and less than or equal to 40 µm, or greater than or equal to 38 µm and less than or equal to 40 µm. In embodiments, the average pore size of the material that is used for the structure that is to contact the glass or ceramic is greater than or equal to 5 µm and less than or equal to 38 µm, such as greater than or equal to 5 µm and less than or equal to 35 µm, greater than or equal to 5 µm and less than or equal to 32 µm, greater than or equal to 5 µm and less than or equal to 30 µm, greater than or equal to 5 µm and less than or equal to 28 µm measured by mercury porosimetry, greater than or equal to 5 µm and less than or equal to 25 µm, greater than or equal to 5 µm and less than or equal to 22 µm, greater than or equal to 5 µm and less than or equal to 20 µm, greater than or equal to 5 µm and less than or equal to 18 µm, greater than or equal to 5 µm and less than or equal to 15 µm, greater than or equal to 5 µm and less than or equal to 12 µm, greater than or equal to 5 µm and less than or equal to 10 µm, or greater than or equal to 5 µm and less than or equal to 8 µm. In embodiments, the average pore size of the material that is used for the structure that is to contact the glass or ceramic is greater than or equal to 8 µm and less than or equal to 38 µm measured by mercury porosimetry, such as greater than or equal to 10 µm and less than or equal to 35 µm, greater than or equal to 12 µm and less than or equal to 32 µm, greater than or equal to 15 µm and less than or equal to 30 µm, greater than or equal to 18 µm and less than or equal to 28 µm, or greater than or equal to 20 µm and less than or equal to 25 µm.

Figure 3A:
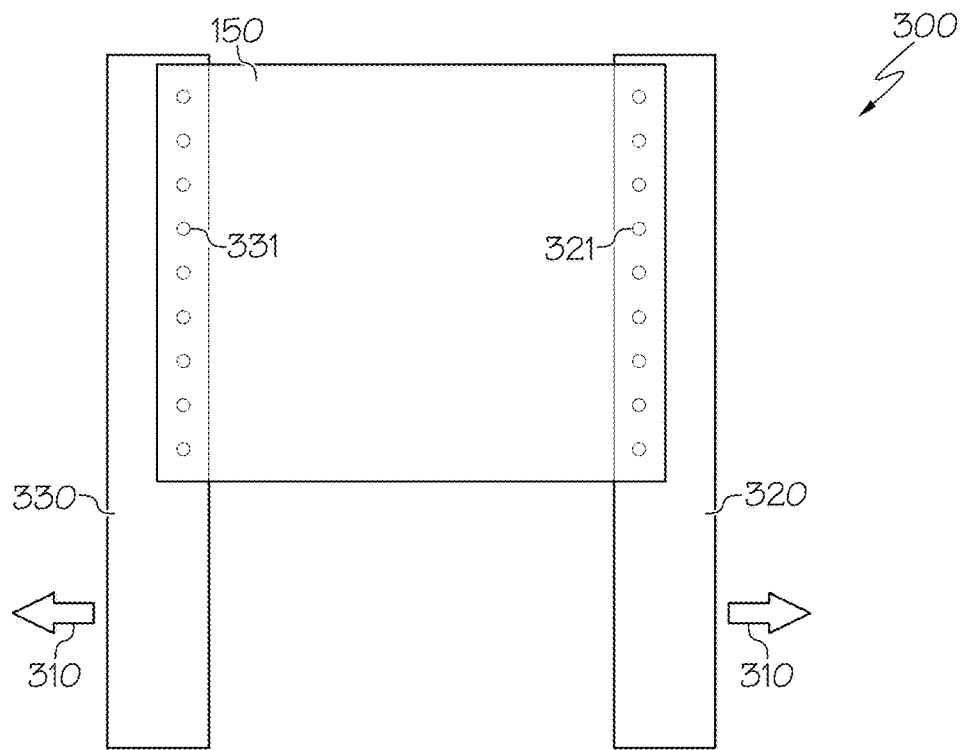
FIGS. 3A and 3B schematically depict vacuum chucks for conducting forming processes according to embodiments disclosed and described herein.
Figure 3B:
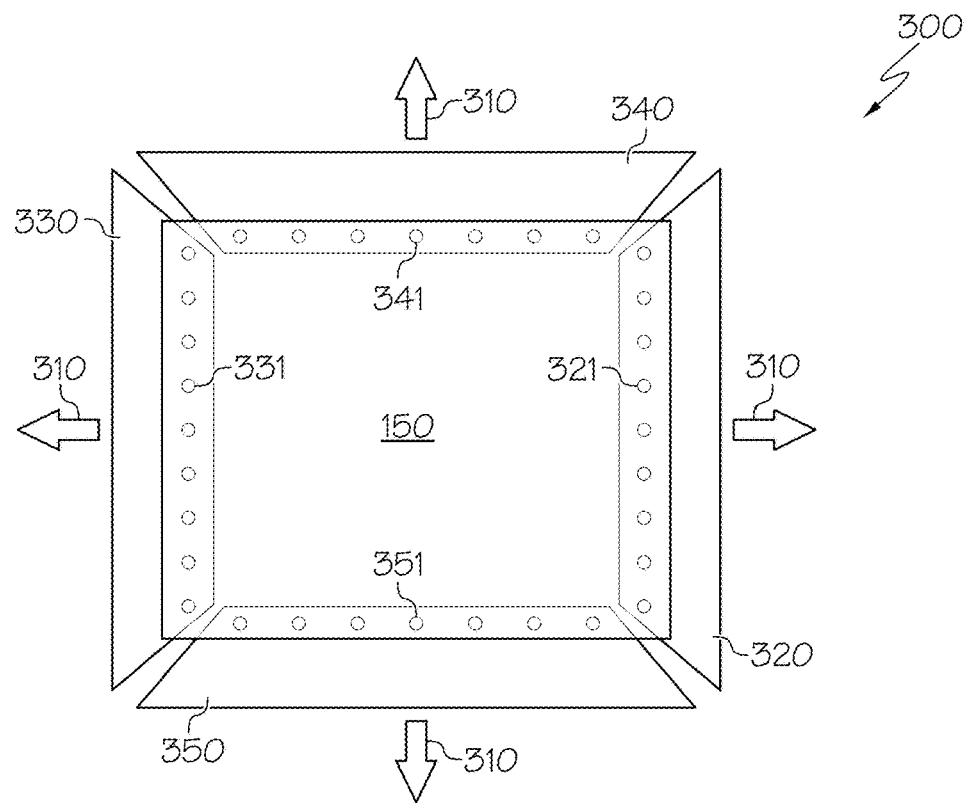

According to embodiments, and with reference to FIGS. 3A and 3B, the vacuum chuck 140 may be a "split chuck." The split chuck 300 can be used to apply a 1-axis (FIG. 3A) or 2-axis (FIG. 3B) tension 310 to the glass or ceramic 150 during the heating process. The tension 310 can improve the ability to remove shape and flatten the glass or ceramic 150 while heating. As shown in FIG. 3A, a first high temperature support 320 is provided on one side of the glass or ceramic 150, and a second high temperature support 330 is provided on a second side of the glass or ceramic 150 that is opposite the first side of the glass or ceramic 150. A vacuum is applied through the pores 321 in the first high temperature support 320 and through the pores 331 in the second high temperature support 330, thereby drawing the glass or ceramic 150 to the first high temperature support 320 and the second high temperature support 330 creating tension 310.

As shown in FIG. 3B a first high temperature support 320 is provided on one side of the glass or ceramic 150, a second high temperature support 330 is provided on a second side of the glass or ceramic 150 that is opposite the first side of the glass or ceramic 150, a third high temperature support 340 is provided on a third side of the glass or ceramic 150, and a fourth high temperature support 350 is provided on a fourth side of the glass or ceramic 150. A vacuum is applied through the pores 321 in the first high temperature support 320, through the pores 331 in the second high temperature support 330, through the pores 341 in the third high temperature support 340, and through pores 351 in the fourth high temperature support 350, thereby drawing the glass or ceramic 150 to the first high temperature support 320, the second high temperature support 330, the third high temperature support 340, and the fourth high temperature support 350, creating tension 310.

Using a split chuck as the vacuum chuck 140 prevents contact between the vacuum chuck 140 and the glass or ceramic 150 while at temperature. Following this process, the contacted portions of the glass or ceramic 150 could be removed to produce a more pristine or flat surface (no residual marks left from chuck or vacuum) enabling flexibility is design of vacuum chuck materials and holes.

Figure 4:
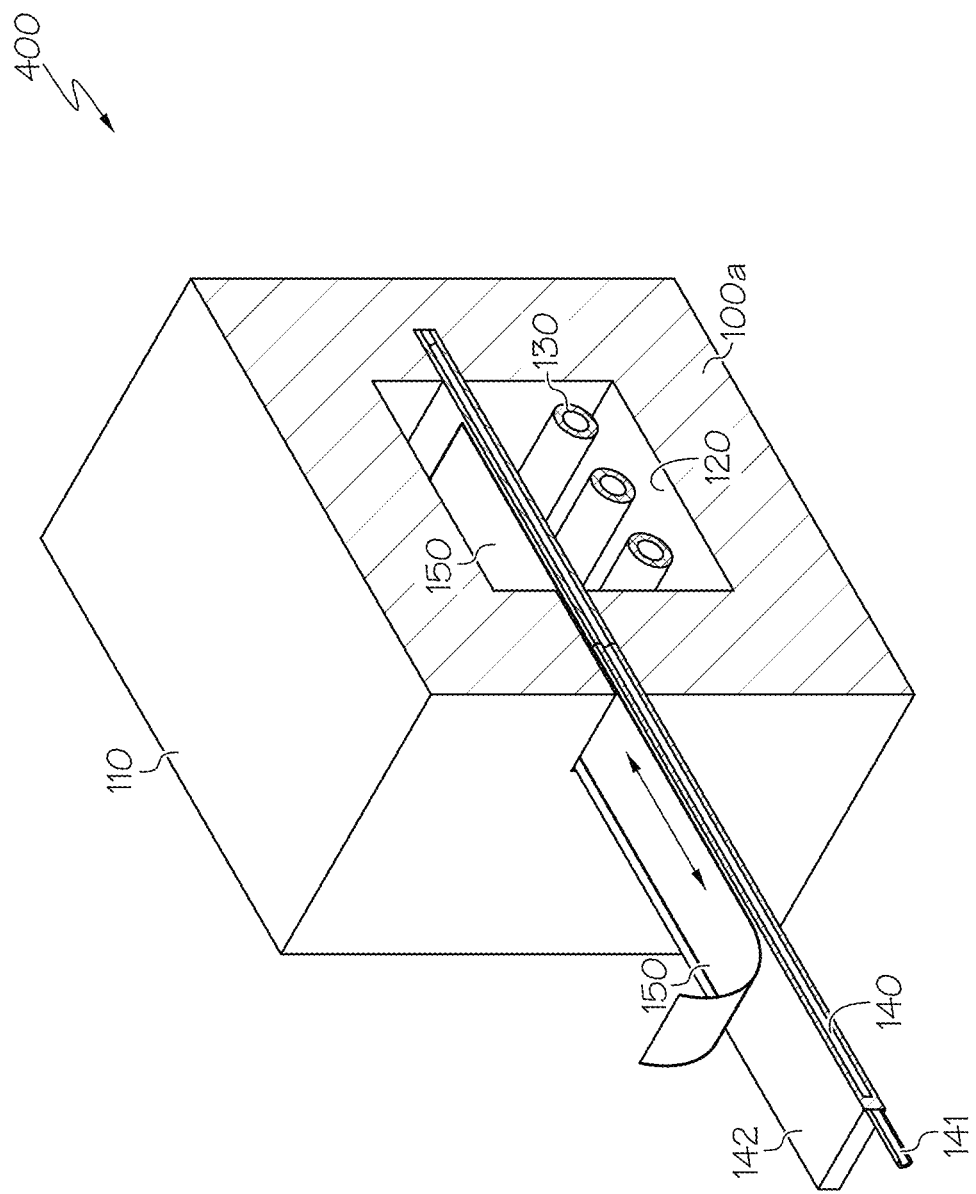
FIG. 4 schematically depicts an apparatus for conducting forming processes according to embodiments disclosed and described herein.

According to embodiments, and with reference to FIG. 4, a system 400 is similar to the system 100 depicted in FIG. 1, but with the previously mentioned porous slider 160 removed. Instead, in system 300, the thin glass or ceramic 150 itself could be placed on the first surface 142 of the vacuum chuck 140 and slid into the furnace 110, making the thermal mass as low as possible. Such embodiments will require a longer sheet of glass or ceramic 150 than in embodiments using a porous slider. In addition, such embodiments would result in a portion of the glass or ceramic 150 that was not introduced into the heating chamber 120 and, therefore, these portions of the glass or ceramic 150 would not be flattened or finished. This would require the flattened or finished section of the glass or ceramic 150 that was introduced into the heating chamber 120 to be separated from the portion of the glass or ceramic 150 that was not flattened or finished. Regardless, such embodiments provide for fast flattening or finishing of the glass or ceramic 150 because of the low thermal mass realized by removing the porous slider 160 from the system.

Figure 5:
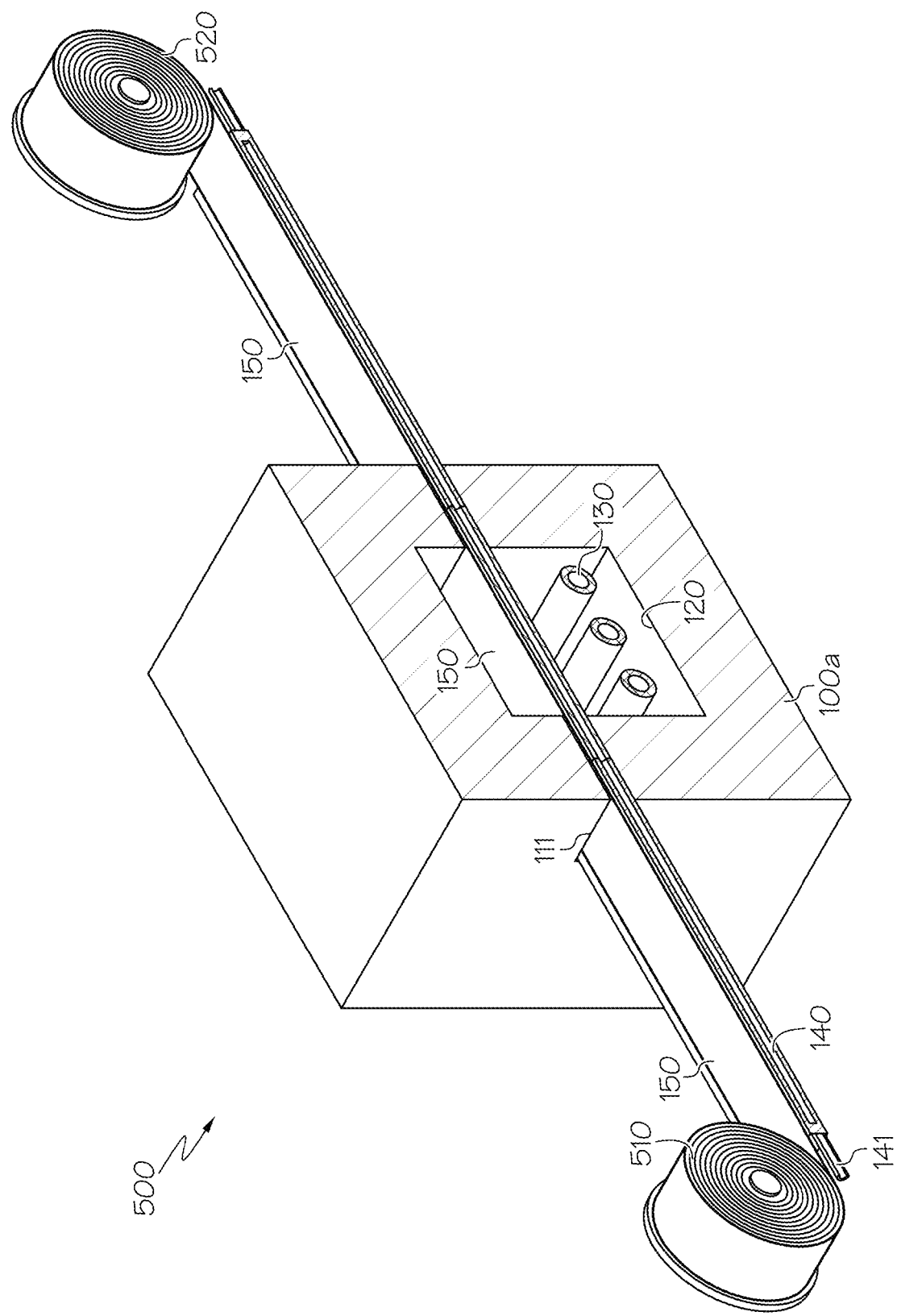
FIG. 5 schematically depicts an apparatus for conducting continuous forming processes according to embodiments disclosed and described herein.

In embodiments, the process could be made continuous. With reference to FIG. 5, a system 500 is similar to system 100 in FIG. 1, but is made continuous by removing the porous slider and having the glass or ceramic 150 and the vacuum chuck 140 reaching through the furnace 110 on both sides. A take up roll 510 may be used in embodiments to pull the glass or ceramic 150 from a unwind roll 520 and through the furnace 110 where it is flattened by being exposed to the vacuum chuck 140. The vacuum pulls the glass or ceramic 150 flat at the entrance and holds the glass or ceramic 150 flat during heating in the heating chamber 120. As the glass or ceramic 150 cools, the glass or ceramic 150 would still be under vacuum, which holds the glass or ceramic 150 flat until it at a temperature less than the creep temperature of the glass or ceramic 150. After cooling, the glass or ceramic is wound into the take up roll 510.

Figure 6:
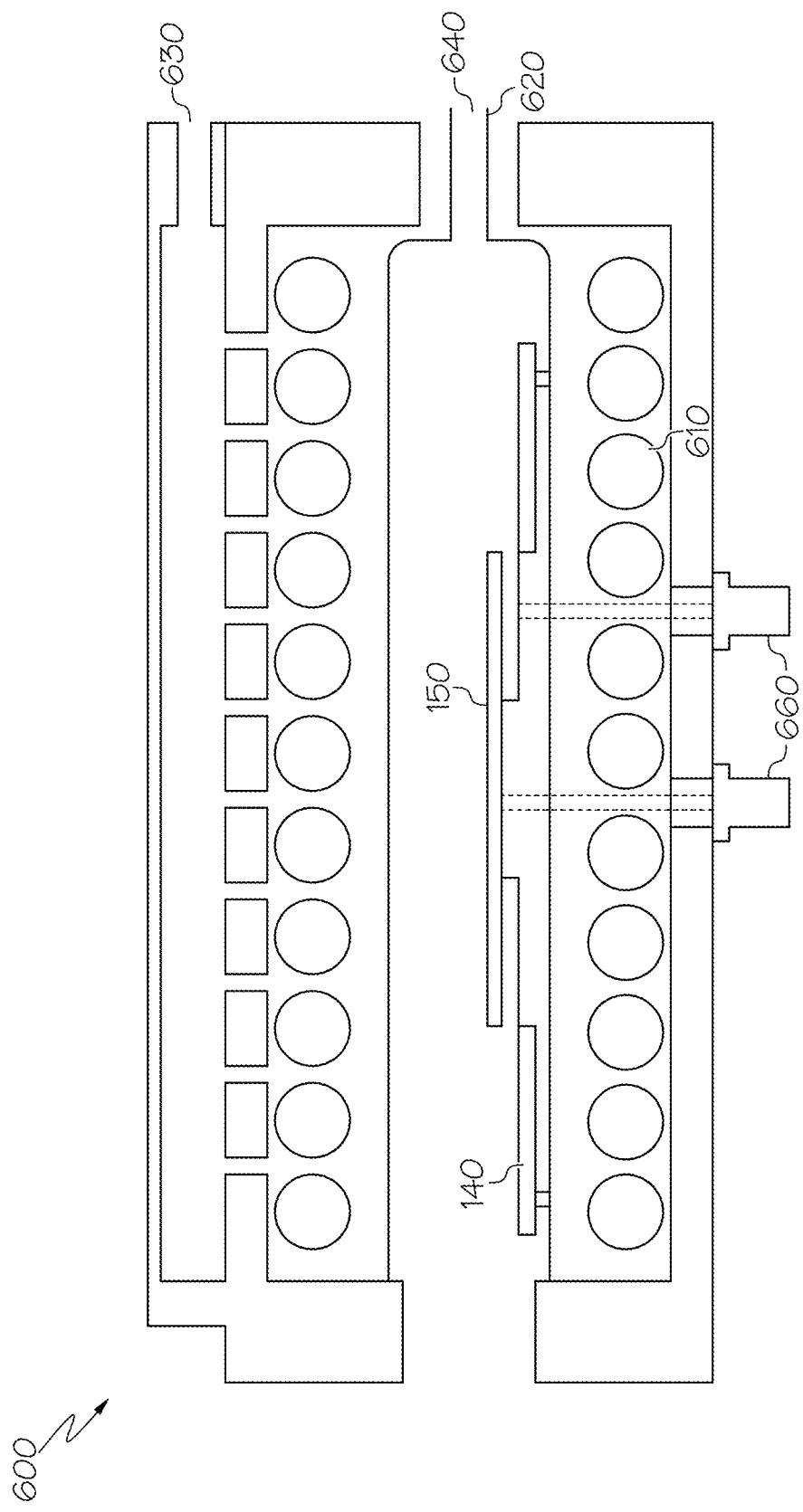
FIG. 6 schematically depicts a rapid thermal annealing apparatus for conducting forming processes according to embodiments disclosed and described herein.

With reference now to FIG. 6, an alternative to the conventional furnace 110 may be used. In such embodiments, a rapid thermal annealing process (RTA) 600 commonly used in for semiconductor processing is used in place of the conventional oven. The RTA equipment is fitted with a vacuum chuck 140 compatible with the thermal shock. The RTA system typically uses a one or more quartz lamps 610 to rapidly heat a small area and thickness (such as the glass or ceramic 150) to high temperatures rapidly. The temperature of the glass or ceramic may be measured by one or more pyrometers 660 positioned within the RTA system. An advantage of the RTA system is the ability to control the environment efficiently. The chamber is generally sealed, for example in a quartz tube 620, allowing purge of an inert or chemically active gas 630 while process gases 640 can be introduced into the RTA system. The RTA system can rapidly heat and cool the small chamber allowing high throughput with high uniformity.

Methods disclosed and described herein can also be used to form a number of different shapes into the glass or ceramic. For example, wells, angles, depressions, 3D and 2D shapes, curves, and any other shape that can be machined into the vacuum surface are examples of shapes that can be formed into the glass or ceramic using the methods disclosed herein. In addition, the shapes can be rapidly formed in a manner of seconds compared to 8 hours currently required for creep flattening methods. In embodiments, the shape can be formed in the glass or ceramic in a time that is less than or equal to 5 minutes, such as less than or equal to 4 minutes, less than or equal to 3 minutes, less than or equal to 2 minutes, less than or equal to 1 minute, less than or equal to 45 seconds, less than or equal to 30 seconds, less than or equal to 15 seconds, less than or equal to 5 seconds, or less than or equal to 1 second.

When the methods disclosed and described herein are used to flatten a glass or ceramic sheet, the resulting flatness can be less than or equal to 15 $\mu m/in^2$, such as less than or equal to 14 $\mu m/in^2$, less than or equal to 13 $\mu m/in^2$, less than or equal to 12 $\mu m/in^2$, less than or equal to 11 $\mu m/in^2$, less than or equal to 10 $\mu m/in^2$, less than or equal to 9 $\mu m/in^2$, less than or equal to 8 $\mu m/in^2$, less than or equal to 7 $\mu m/in^2$, less than or equal to 6 $\mu m/in^2$, or less than or equal to 5 $\mu m/in^2$. The flatness, according to embodiments, is measured using a commercially available deflectometer used for optical (not contact) measurement of shape (displacement) and curvature of specular (reflective) surfaces. The system projects a dark to light gradient pattern on the surface to be measured and a camera records the reflected image from the targeted surface. A series of gradients at various frequencies are projected. Based on differences between the recorded image and the known projected image with principles of Moirê deflectometry, the shape of the surface can be determined precisely.

In addition, the average size of defects measured by Zygo instrumentation of the glass or ceramic sheet is, in embodiments, from greater than or equal to 0.5 μm to less than or equal to 15.0 μm, such as from greater than or equal to 1.0 μm to less than or equal to 15.0 μm, from greater than or equal to 2.0 μm to less than or equal to 15.0 μm, from greater than or equal to 3.0 μm to less than or equal to 15.0 μm, from greater than or equal to 4.0 μm to less than or equal to 15.0 μm, from greater than or equal to 4.0 μm to less than or equal to 15.0 μm, from greater than or equal to 5.0 μm to less than or equal to 15.0 μm, from greater than or equal to 6.0 μm to less than or equal to 15.0 μm, from greater than or equal to 7.0 μm to less than or equal to 15.0 μm, from greater than or equal to 8.0 μm to less than or equal to 15.0 μm, from greater than or equal to 9.0 μm to less than or equal to 15.0 μm, from greater than or equal to 2.0 μm to less than or equal to 15.0 μm, from greater than or equal to 11.0 μm to less than or equal to 15.0 μm, from greater than or equal to 12.0 μm to less than or equal to 15.0 μm, from greater than or equal to 13.0 μm to less than or equal to 15.0 μm, or from greater than or equal to 14.0 μm to less than or equal to 15.0 μm. In some embodiments, the average size of defects measured by Zygo instrumentation of the glass or ceramic sheet is from greater than or equal to 0.5 μm to less than or equal to 14.0 μm, such as from greater than or equal to 0.5 μm to less than or equal to 13.0 μm, from greater than or equal to 0.5 μm to less than or equal to 12.0 μm, from greater than or equal to 0.5 μm to less than or equal to 11.0 μm, from greater than or equal to 0.5 μm to less than or equal to 10.0 μm, from greater than or equal to 0.5 μm to less than or equal to 9.0 μm, from greater than or equal to 0.5 μm to less than or equal to 8.0 μm, from greater than or equal to 0.5 μm to less than or equal to 7.0 μm, from greater than or equal to 0.5 μm to less than or equal to 6.0 μm, from greater than or equal to 0.5 μm to less than or equal to 5.0 μm, from greater than or equal to 0.5 μm to less than or equal to 4.0 μm, from greater than or equal to 0.5 μm to less than or equal to 3.0 μm, from greater than or equal to 0.5 μm to less than or equal to 2.0 μm, or from greater than or equal to 0.5 μm to less than or equal to 1.0 μm.

With reference now to FIGS. 7A to 7D, various methods and apparatuses for forming shapes in a glass or ceramic will be described.

Figure 7A:
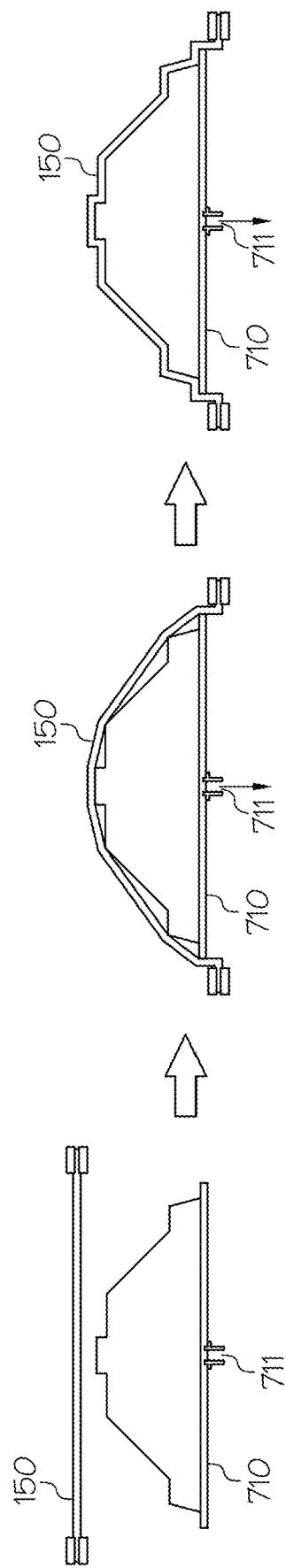
FIGS. 7A to 7D schematically depict shaping tools according to embodiments disclosed an described herein.
Figure 7B:
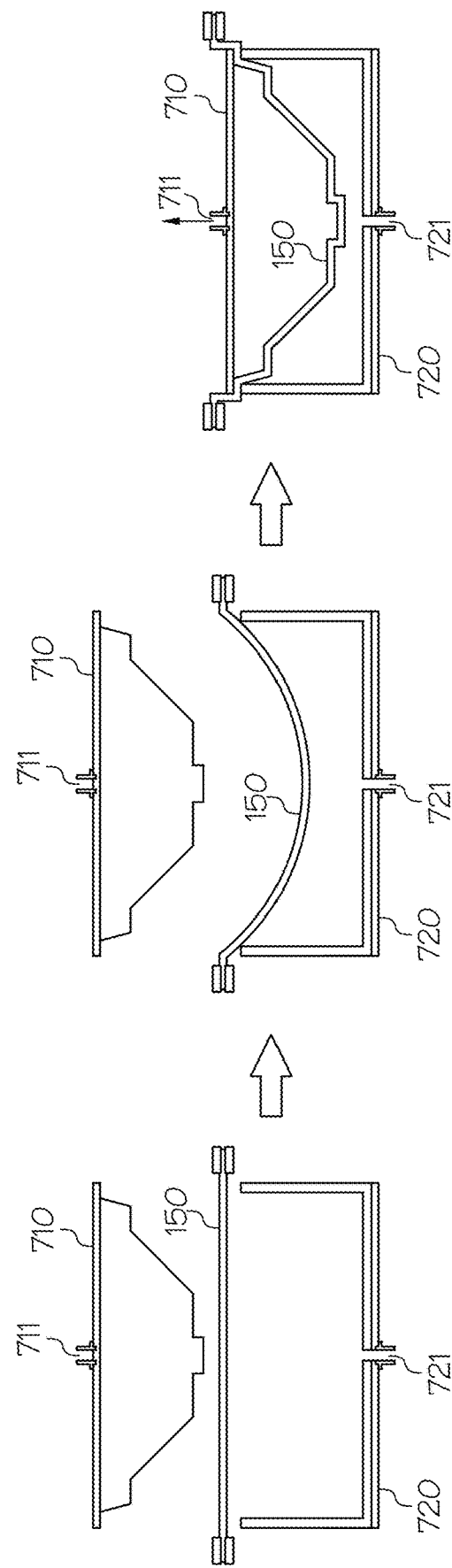

In each of FIGS. 7A and 7B a male shaping tool 710 is used. The male shaping tool 710 has, in embodiments, the physical properties—such as thermal shock resistance, porosity, and/or pore size—as the porous vacuum chuck 140 or porous slider 160 described herein. The male shaping tool 710 has a vacuum port 711 that is used to draw a vacuum through the male shaping tool 710.

In the first (left) image in FIG. 7A, a glass or ceramic sheet 150 is placed adjacent to male shaping tool 710. In the second image in FIG. 7A, the glass or ceramic sheet 150 is heated to a temperature that is greater than or equal to the creep temperature of the glass or ceramic sheet 150, which causes the glass or ceramic sheet 150 to bow over the male shaping tool 710. In the third image in FIG. 7A a vacuum is drawn through the male shaping tool 710 via the vacuum port 711, which draws the glass or ceramic sheet 150 to the male shaping tool 710. The vacuum is held at least until the glass or ceramic sheet 150 is cooled to a temperature that is below the creep temperature of the glass or ceramic sheet 150.

In the first (left) image in FIG. 7B, a glass or ceramic sheet 150 is placed over a forming cavity 720 and is adjacent to male shaping tool 710. In the second image in FIG. 7B, the glass or ceramic sheet 150 is heated to a temperature that is greater than or equal to the creep temperature of the glass or ceramic sheet 150, which causes the glass or ceramic sheet 150 to sag into the forming cavity 720. The forming cavity 720 may be equipped with a gas exit port 721 that allows gases within the forming cavity 720 to exit the forming cavity 720 as the gases are displace by the glass or ceramic sheet 150 and/or the male forming tool 710. In the third image in FIG. 7B a vacuum is drawn through the male shaping tool 710 via the vacuum port 711, which draws the glass or ceramic sheet 150 to the male shaping tool 710. The vacuum is held at least until the glass or ceramic sheet 150 is cooled to a temperature that is below the creep temperature of the glass or ceramic sheet 150.

Figure 7C:
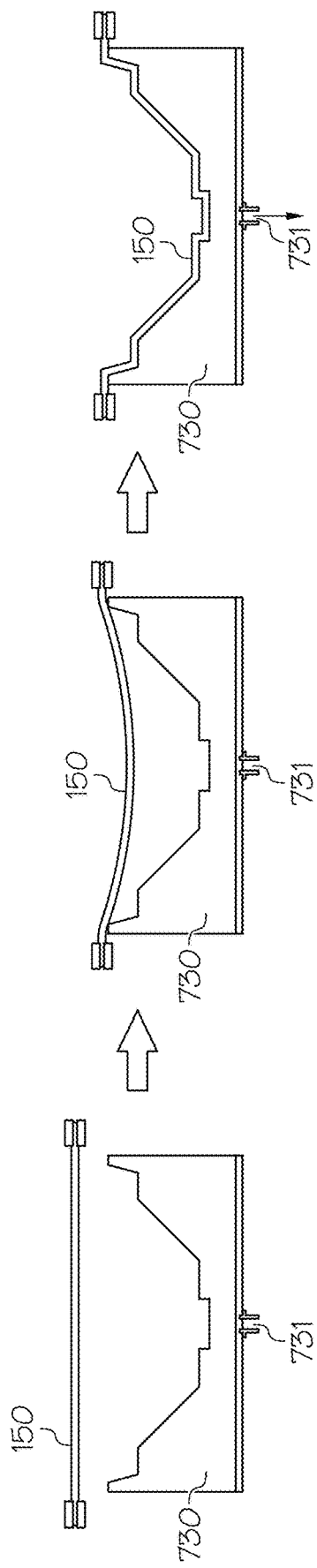
Figure 7D:
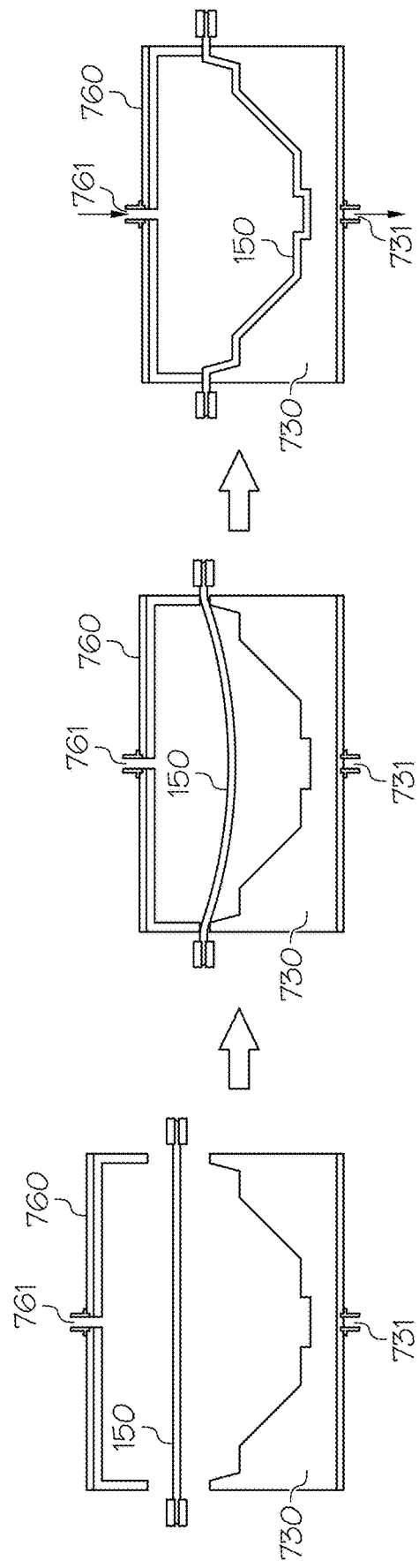

In each of FIGS. 7C and 7D a female shaping tool 730 is used. The female shaping tool 730 has, in embodiments, the physical properties—such as thermal shock resistance, porosity, and/or pore size—as the porous vacuum chuck 140 or porous slider 160 described herein. The female shaping tool 730 has a vacuum port 731 that is used to draw a vacuum through the female shaping tool 730.

In the first (left) image in FIG. 7C, a glass or ceramic sheet 150 is placed adjacent to the female shaping tool 730. In the second image in FIG. 7C, the glass or ceramic sheet 150 is heated to a temperature that is greater than or equal to the creep temperature of the glass or ceramic sheet 150, which causes the glass or ceramic sheet 150 to cave into the female shaping tool 730. In the third image in FIG. 7C a vacuum is drawn through the female shaping tool 730 via the vacuum port 731, which draws the glass or ceramic sheet 150 to the female shaping tool 730. The vacuum is held at least until the glass or ceramic sheet 150 is cooled to a temperature that is below the creep temperature of the glass or ceramic sheet 150.

In the first (left) image in FIG. 7D, a glass or ceramic sheet 150 is placed adjacent to the female shaping tool 730 and a cover 760. The cover 760 is equipped with a gas entrance port 761. In the second image in FIG. 7D, the glass or ceramic sheet 150 is heated to a temperature that is greater than or equal to the creep temperature of the glass or ceramic sheet 150, which causes the glass or ceramic sheet 150 to cave into the female shaping tool 730, and the cover 760 is lowered to the female shaping tool 730. In the third image in FIG. 7D a vacuum is drawn through the female shaping tool 730 via the vacuum port 731 and pressure is applied to the glass or ceramic sheet 150 by introducing gas via gas entrance port 761, which draws and pushes the glass or ceramic sheet 150 to the female shaping tool 730. The vacuum and pressure is held at least until the glass or ceramic sheet 150 is cooled to a temperature that is below the creep temperature of the glass or ceramic sheet 150.

It should be understood that a glass or ceramic sheet 150 may be formed into a shape using a combination of a male shaping tool 710 and a corresponding female shaping tool 730 according to one or more embodiments.

Figure 8A:
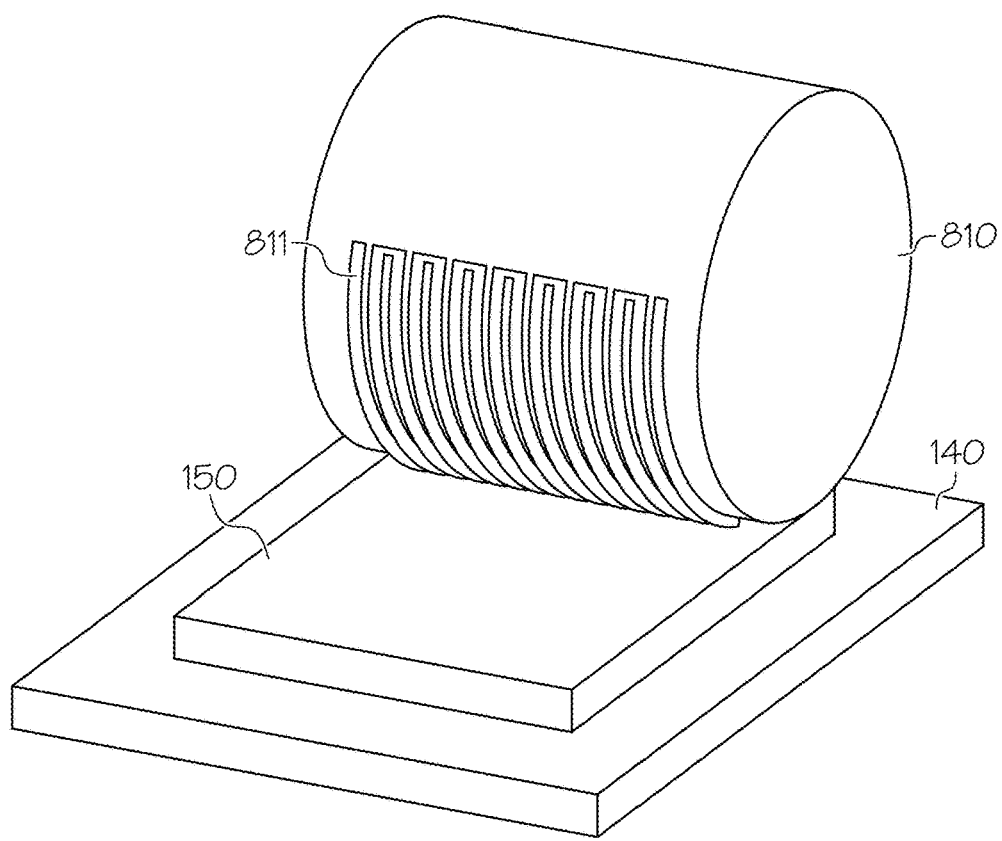
FIGS. 8A and 8B schematically depict imprint apparatus according to embodiments disclosed and described herein.
Figure 8B:
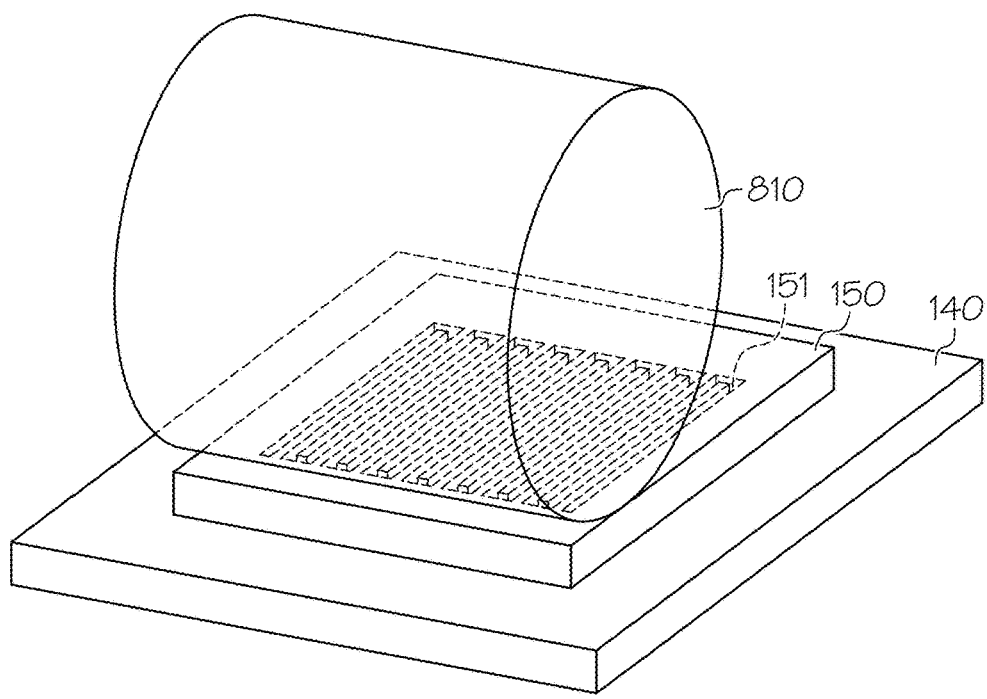

With reference now to FIGS. 8A and 8B, a pattern or imprint 151 can be imparted to a glass or ceramic sheet 150 by in an imprint roll 810. In FIG. 8A, a glass or ceramic sheet 150 is positioned adjacent to an imprint roll 810 while the glass or ceramic sheet 150 is at a temperature that is greater than or equal to the creep temperature of the glass or ceramic sheet 150. The imprint roll 810 has an imprint pattern 811 formed thereon. The glass or ceramic sheet 150 is positioned on a vacuum chuck 140 and the glass or ceramic sheet 150 is drawn to the vacuum chuck 140 by drawing a vacuum through the vacuum chuck 140 as described previously. By drawing the glass or ceramic sheet 150 to the vacuum chuck 140 during the imprinting process, the glass or ceramic sheet 150 can be held stationary to help ensure an accurate translation of the imprint pattern 811 to the glass or ceramic sheet 150. In FIG. 8B the imprint roll 810 is rolled over the glass or ceramic sheet 150 while the glass or ceramic sheet 150 is at a temperature that is greater than or equal to the creep temperature of the glass or ceramic sheet 150, thereby translating the imprint pattern 811 from the imprint roll 810 to the glass or ceramic sheet 150, as indicated by imprint 151. The glass or ceramic sheet 150 may subsequently be cooled to a temperature that is less than the creep temperature of the glass or ceramic sheet 150, thereby permanently imparting the imprint 151 in the glass or ceramic sheet 150. It should be understood that although FIGS. 8A and 8B apply the imprint 151 to the glass or ceramic sheet 150 by an imprint roll 810, other mechanisms can be used to apply the imprint 151 to the glass or ceramic sheet 150, such as, for example, a stamp.

EXAMPLES

Embodiments will be further clarified by the following examples.

Example 1

In this example, a 40 μm thick alumina tape was used as the glass or ceramic sheet. A sample with a width of approximately 1.5 inches having shape resulting from continuous sintering was placed on a vacuum chuck, which was then slid into a furnace while sitting on the chuck with no vacuum. Once in the furnace, a vacuum of approximately −12 inches mercury was applied at a temperature of 1360° C. for approximately 5 minutes. While still under vacuum, the alumina tape was removed from the furnace. The resulting, flattened alumina tape had the flatness and texture of the vacuum chuck embedded into the part itself.

Example 2

In this example, an alumina sheet having dimensions of approximately 1.5 inches by 12 inches and a thickness of 40 µm was slid onto the top surface of the vacuum chuck, with the furnace at a temperature of 1360° C. Approximately 6 inches of the vacuum chuck was outside of the furnace, leaving about 6 inches of the tape inside the exterior of the furnace. The vacuum chuck, with the sintered tape on top, was slid into the furnace until only 1 inch remained outside of the furnace. The insertion took approximately one minute. The vacuum was turned on and the tape appeared to flatten almost immediately, but was left in the furnace for approximately 5 minutes. The vacuum was left on and the sheet was removed from the furnace over the course of one minute. The vacuum was released, showing the tape's new visual features. In this example, the bearings had been ground, yet the samples had a textured surface. The resulting dimples were all raised, suggesting debris on the bearing had been caught between the tape and bearing surface.

Example 3

Figure 9A:
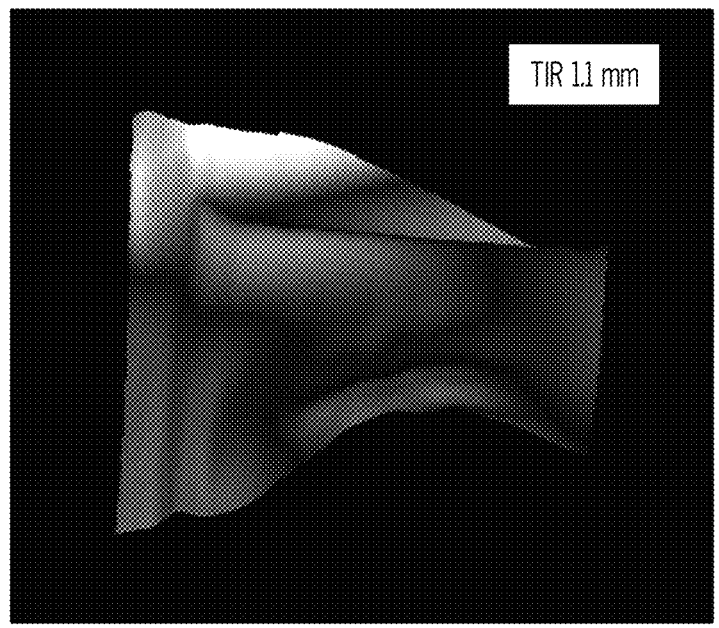
FIG. 9A illustrates as-fired glass sheet before any flattening is performed.
Figure 9B:
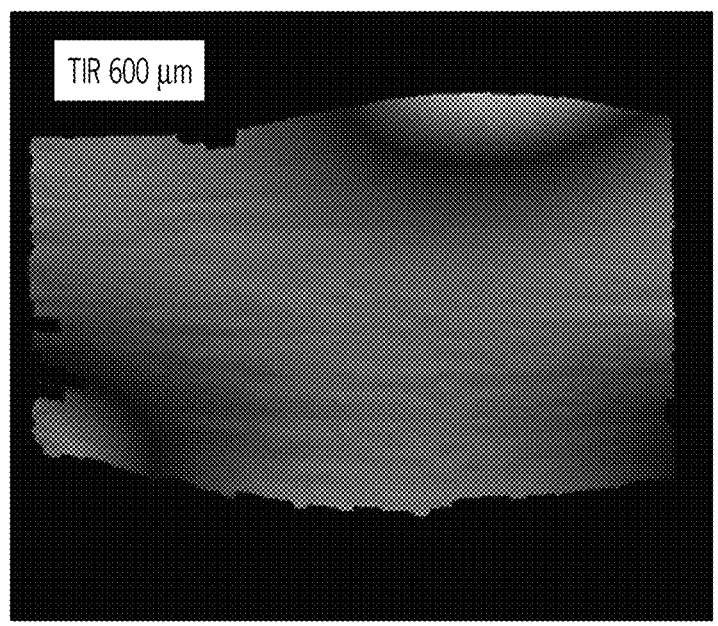
FIG. 9B depicts a TIR image of a 600 μm portion of the glass sheet after conventional creep flattening.
Figure 9C:
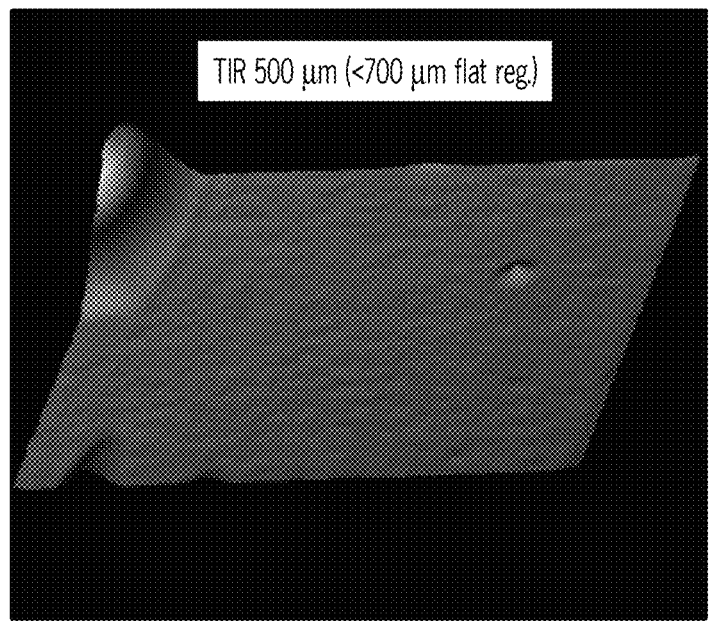
FIG. 9C depicts a TIR image of a shows a TIR image of a 500 μm portion of the glass sheet after flattening according to embodiments disclosed and described herein.

A comparison of conventional creep flattening to flattening according to embodiments disclosed and described herein are provided with reference to FIGS. 9A to 9C. Two identical alumina sheets were formed for this example. FIG. 9A shows an as-fired alumina sheet before any flattening is performed. The glass sheet is approximately 4 inches by 4 inches, and FIG. 9A shows the glass sheet using thermal infrared (TIR) imaging of a 1.1 mm portion of the glass sheet. Two methods were used to flatten the as-fired glass sheet, conventional creep flattening and flattening according to methods disclosed and described herein. FIG. 9B shows a TIR image of a 600 µm portion of the glass sheet after conventional creep flattening. As can be seen in FIG. 9B, waves and areas of local curvature are present in the glass. FIG. 9C shows a TIR image of a 500 µm portion of the glass sheet after flattening according to embodiments disclosed and described herein. As can be seen in FIG. 9C, the overall flatness of the glass sheet is improved over the conventional creep flattening process, and the glass sheet has an overall flatness of less than 50 µm.

Example 4

For this example, seventeen samples were made as outlined in Table 1 below. For each sample, the following procedure was followed. Two bearings were used and started with a 10 standard liter per minute (slpm) flow of argon (Ar) in each bearing. Just prior to inserting a sample into the apparatus, the flow of Ar was increased to 40 slpm. The sample is inserted into the apparatus, and the flow of Ar is dropped to 10 slpm. Then, a vacuum was pulled to the inches of mercury (inHg) shown in Table 1 by adjusting the flow of Ar, and the sample was held in the apparatus for one minute. The flow of Ar in the bottom bearing is then adjusted back to 10 slpm. Subsequently, the sample was quickly removed from the apparatus.

TABLE 1

| Sample | Final Size | Vac. (inHg) | Bottom flow post vac (slpm) | Removal Rate (ipm) | TIR (mm) | Ave. Diopter | Max. Diopter |
|---|---|---|---|---|---|---|---|
| C1 | 2.5 × 2.5 | | | | 0.453 | 2.65 | 39.035 |
| 1 | 2.5 × 2.5 | −12 | 1 | 600 | 0.489 | 1.691 | 17.299 |
| 2 | 2.5 × 2.5 | −12 | 1 | 6 | 0.441 | 1.691 | 17.607 |
| 3 | 2.5 × 2.5 | −12 | 5 | 600 | 0.4 | 1.562 | 11.708 |
| 4 | 2.5 × 2.5 | −12 | 5 | 6 | 0.45 | 1.564 | 15.135 |
| 5 | 2.5 × 2.5 | −12 | 10 | 600 | 0.408 | 1.564 | 8.539 |
| 6 | 2.5 × 2.5 | −12 | 10 | 6 | 0.419 | 1.565 | 16.674 |
| C2 | | | | | 0.338 | 4.004 | 21.673 |
| 7 | 2 × 2 | −12 | 1 | 600 | 0.248 | 1.577 | 29.935 |
| C3 | | | | | 0.508 | 4.241 | 28.485 |
| 8 | 2 × 2 | −12 | 1 | 6 | 0.274 | 1.564 | 8.315 |
| C4 | | | | | 0.222 | 2.479 | 17.492 |
| 9 | 2 × 2 | −2 | 1 | 600 | 0.274 | 1.605 | 9.771 |
| C5 | | | | | 0.276 | 3.096 | 23.66 |
| 10 | 2 × 2 | −2 | 1 | 6 | 0.274 | 1.613 | 9.678 |
| 11 | 2.5 × 7 | −12 | 1 | 600 | 0.848 | 1.549 | 22.045 |
| 12 | 2.5 × 7 | −5 | 1 | 600 | 0.893 | 1.565 | 14.147 |

| Sample | TIR Change | Ave Diopter Change | % TIR Change | % Diopter Change |
|---|---|---|---|---|
| C1 | | | | |
| 1 | −0.036 | 0.959 | −7.95% | 36.19% |
| 2 | 0.012 | 0.959 | 2.65% | 36.19% |
| 3 | 0.053 | 1.088 | 11.70% | 41.06% |
| 4 | 0.003 | 1.086 | 0.66% | 40.98% |
| 5 | 0.045 | 1.086 | 9.93% | 40.98% |
| 6 | 0.034 | 1.085 | 7.51% | 40.94% |
| C2 | | | | |
| 7 | 0.205 | 1.073 | 26.63% | 60.61% |

TABLE 1-continued

| | | | | |
|---|---|---|---|---|
| C3 | | | | |
| 8 | 0.179 | 1.086 | 46.06% | 63.12% |
| C4 | | | | |
| 9 | 0.179 | 1.045 | −23.42% | 35.26% |
| C5 | | | | |
| 10 | 0.179 | 1.037 | 0.72% | 47.90% |
| 11 | −0.395 | 1.101 | −87.20% | 41.55% |
| 12 | −0.44 | 1.085 | −97.13% | 40.94% |

Diopter and total indicator reading (TIR) are measured by imaging an entire part using a phase measuring deflectometer manufactured by ISRA Vision as described in Knauer et al., "Phase Measuring Deflectometry: A New Approach To Measure Specular Free-Form Surfaces," Institute of Optics, Information and Photonics, University of Erlangen-Nuremberg, Staudtstr. 7/B2, 91058. Curvature was calculated by taking the two dimensional derivative of this slope map, and the units are then in mm/mm$^2$, or 1/mm. The ISRA Vision system defaults to units of meters, and so the curvature map is in units of 1/m, which is the unit for diopter. The surface topography is calculated by integrating the slope map, and so those surface topography values will have units of mm. Diopter measurements come directly from the curvature map. For TIR measurements the deflectometer output data map sets of surface topography and surface curvature are applied to an existing standard (like ASTM) in order to get TIR value.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for finishing a glass or ceramic article comprising:
    applying a force to the glass or ceramic article, wherein the force is applied to the glass or ceramic article at least when the glass or ceramic article is at a temperature that is greater than or equal to a creep temperature of the glass or ceramic article, the force is applied to the glass or glass ceramic article by a vacuum chuck and drawing a vacuum through the vacuum chuck, and wherein a porous slider is positioned between the glass or ceramic article and the vacuum chuck, and the porous slider is configured so that the glass or ceramic article is in physical contact with the porous slider and the vacuum is drawn through the porous slider and the vacuum chuck; and
    holding the force to the glass or ceramic article as the glass or ceramic article is cooled to a temperature that is less than the creep temperature of the glass or ceramic article.

2. The method of claim 1, wherein the vacuum chuck has a porosity from greater than or equal to 5% and less than or equal to 22% measured using mercury porosimetry.

3. The method of claim 1, wherein the vacuum chuck has an average pore size from greater than or equal to 5 μm and less than or equal to 40 μm measured by mercury porosimetry.

4. The method of claim 1, wherein the glass or ceramic article is continuously fed into a furnace that heats the glass or ceramic article to a temperature that is greater than or equal to the creep temperature of the glass or ceramic article.

5. The method of claim 1, wherein the finished glass or ceramic article has a flatness of less than or equal to 15 μm/in$^2$.

6. The method of claim 1, wherein the finished glass or ceramic article has a surface roughness of greater than or equal to 0.5 μm and less than or equal to 15.0 μm.

7. The method of claim 1, wherein the vacuum chuck comprises silicon carbide, silicon nitride, or alumina.

8. The method of claim 1, wherein the porous slider has a porosity from greater than or equal to 5% and less than or equal to 22% measured using mercury porosimetry.

9. The method of claim 1, wherein the porous slider has an average pore size from greater than or equal to 5 μm and less than or equal to 40 μm measured by mercury porosimetry.

10. The method of claim 1, wherein
    the vacuum chuck is positioned on a first side of the glass or ceramic article, and
    an additional force is applied to the glass or ceramic article by an air bearing that is positioned on a second side of the glass or ceramic article, and the second side of the glass or ceramic article is opposite the first side of the glass or ceramic article.

11. The method of claim 10, wherein a gap between the air bearing and the second surface of the glass or ceramic article is less than or equal to 10 μm.

12. A method for forming a shaped glass or ceramic article comprising:
    positioning a glass or ceramic sheet adjacent to a forming tool;
    applying a force to the glass or ceramic sheet, wherein the force is applied to the glass or ceramic sheet at least when the glass or ceramic sheet is at a temperature that is greater than or equal to a creep temperature of the glass or ceramic sheet, the force applies a tension to the glass or ceramic article, the tension is applied along two axes, and the force draws the glass or ceramic sheet to the forming tool such that the glass or glass ceramic article is in physical contact with the forming tool; and
    holding the force to the glass or ceramic sheet as the glass or ceramic sheet is cooled to a temperature that is less than the creep temperature of the glass or ceramic sheet, thereby forming the shaped glass or ceramic article.

13. The method of claim 12, wherein the forming tool has a porosity from greater than or equal to 5% and less than or equal to 22% measured using mercury porosimetry.

14. The method of claim 12, wherein the forming tool has an average pore size from greater than or equal to 5 μm and less than or equal to 40 μm measured by mercury porosimetry.

15. The method of claim 12, wherein the shaped glass or ceramic article is formed in a time that is less than or equal to 5 minutes.

16. The method of claim 12, wherein the shaped glass or ceramic article has a surface roughness of greater than or equal to 0.5 μm and less than or equal to 15.0 μm.

* * * * *